Patented Nov. 18, 1930

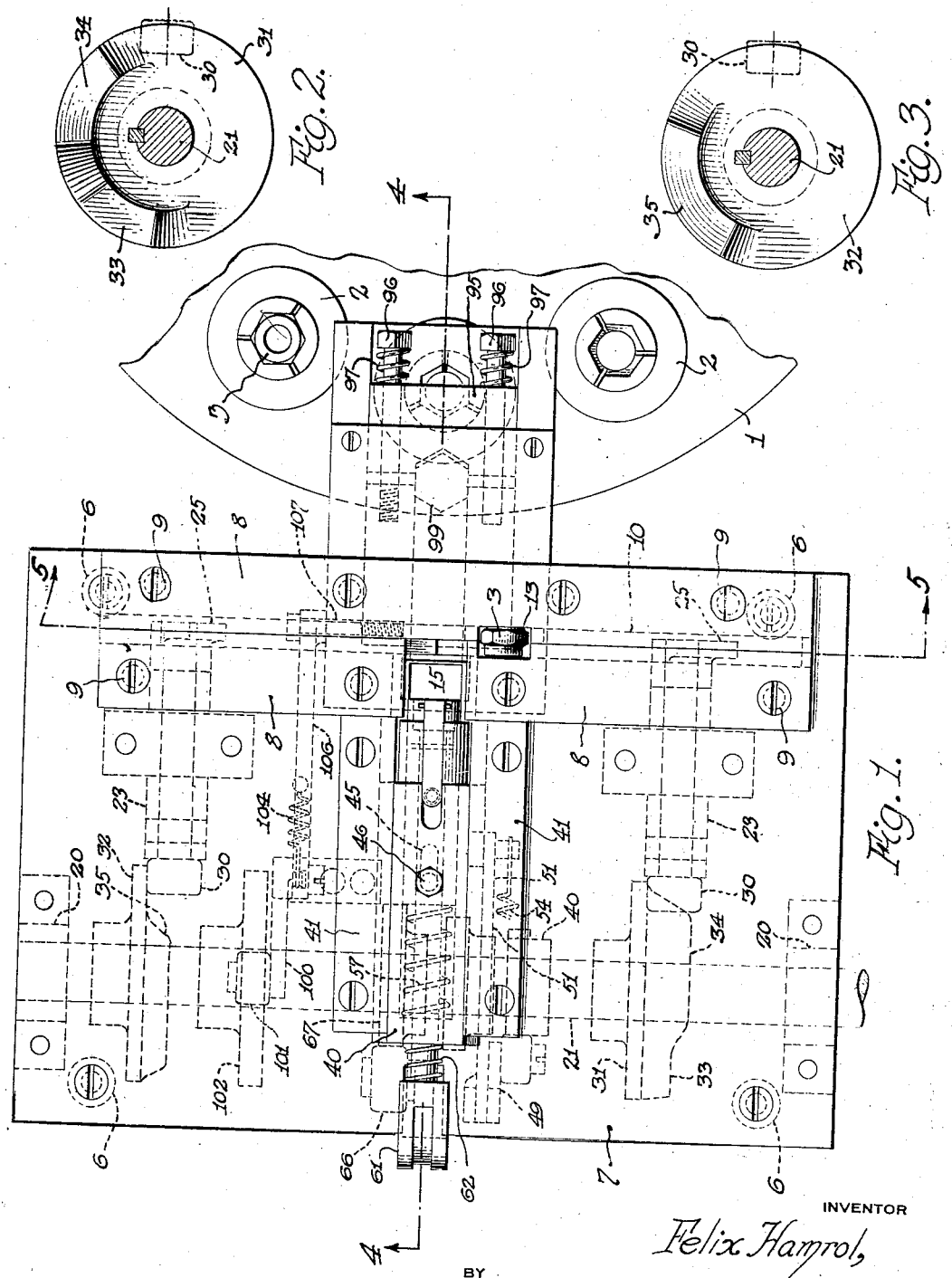

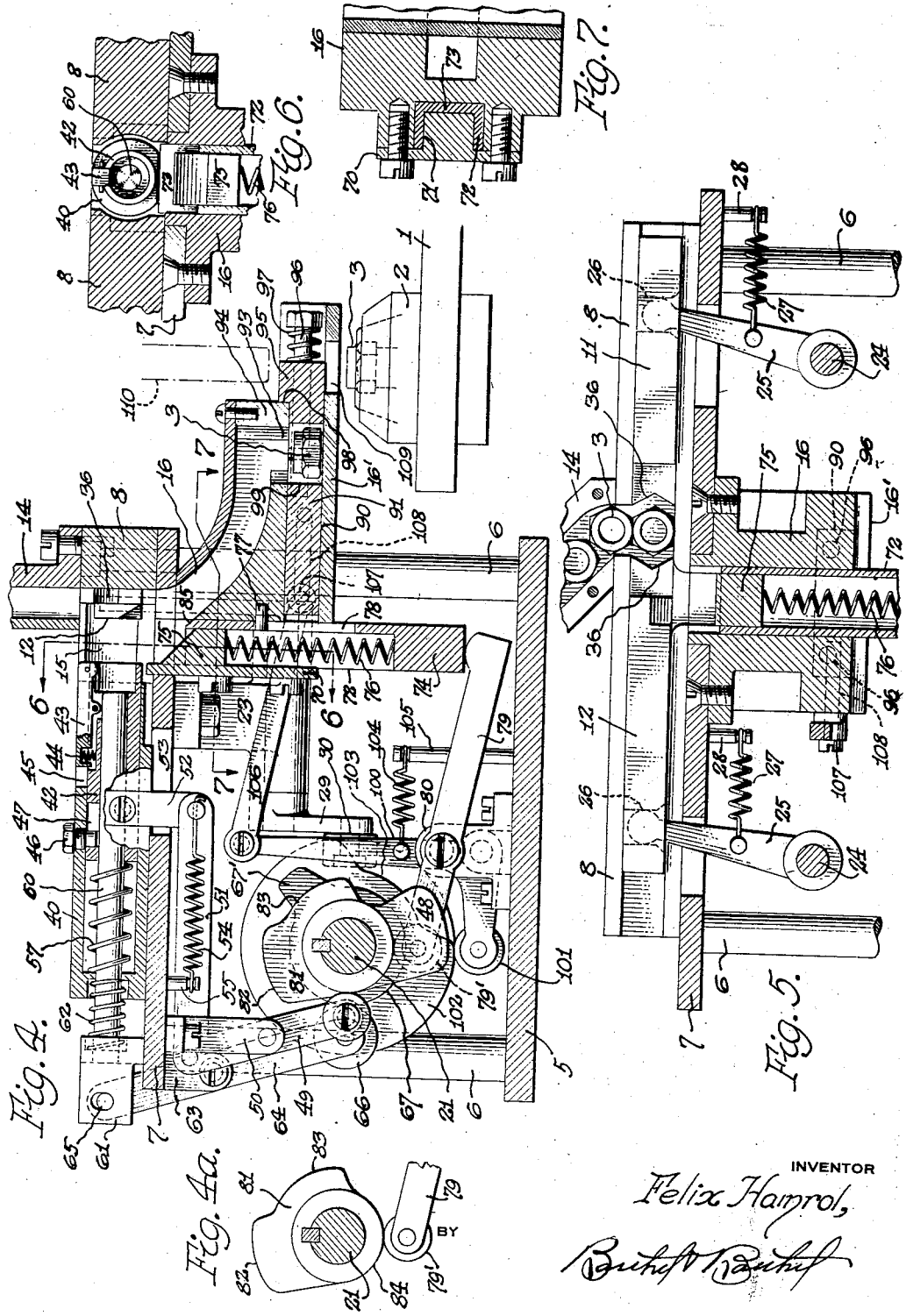

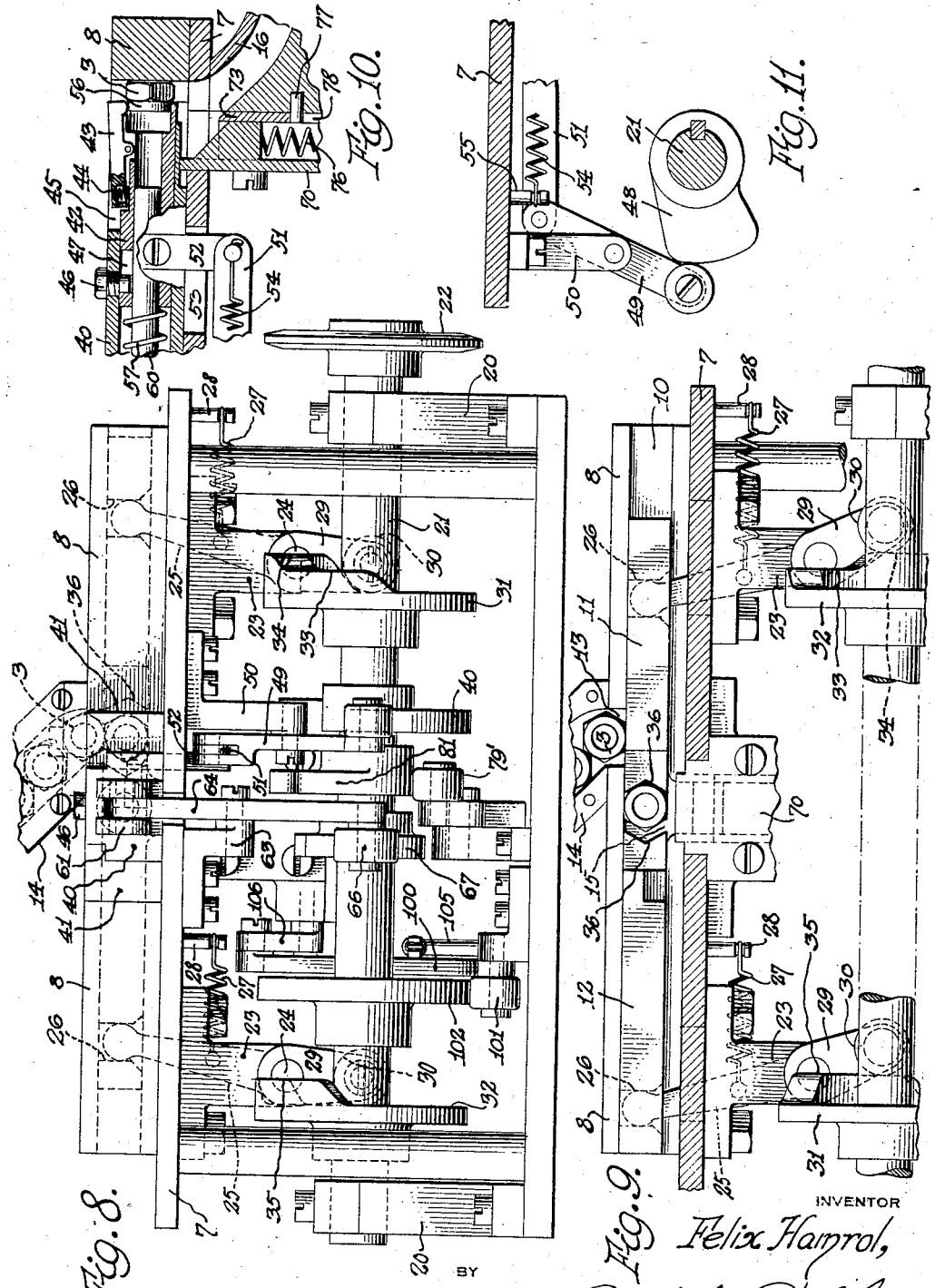

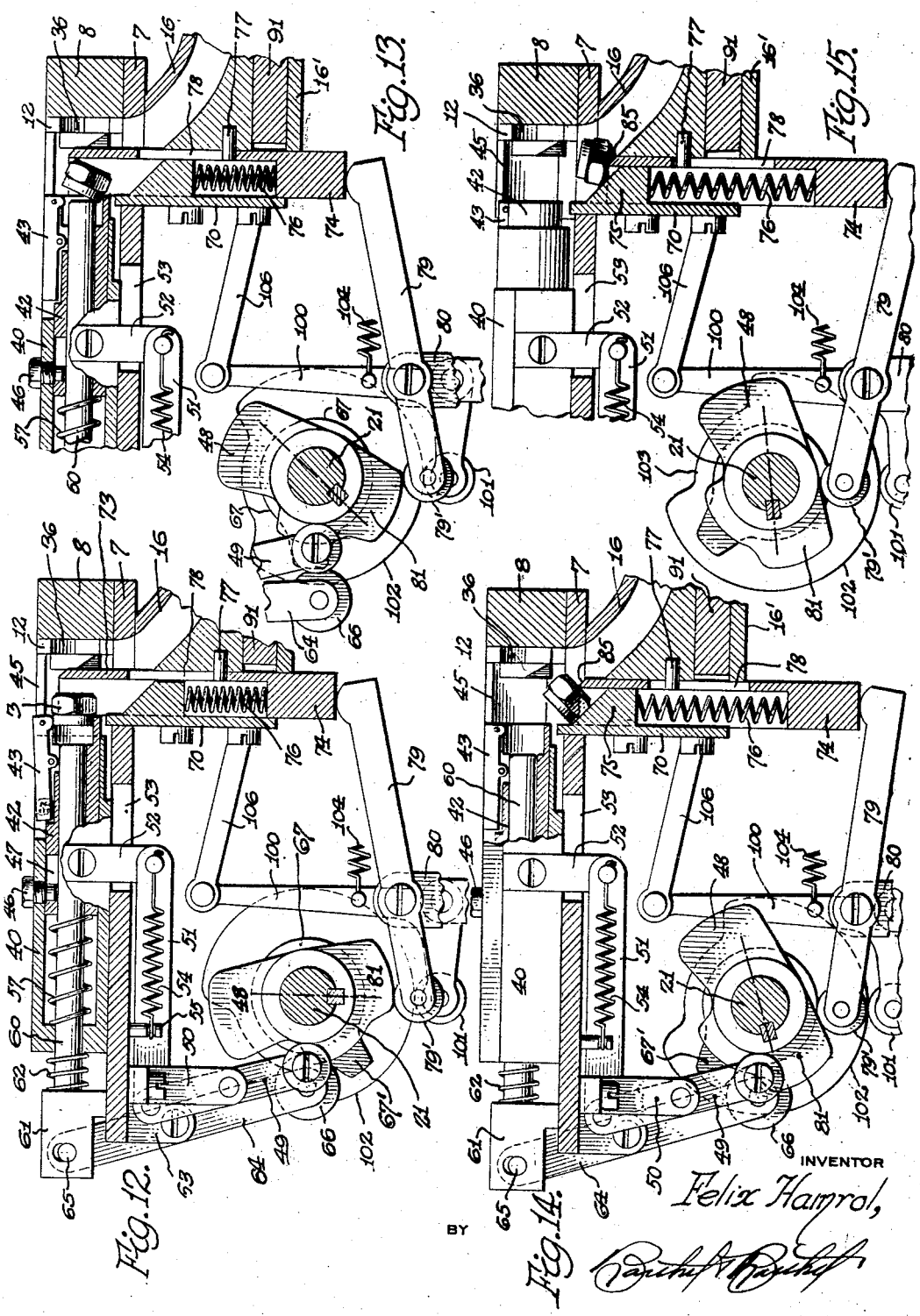

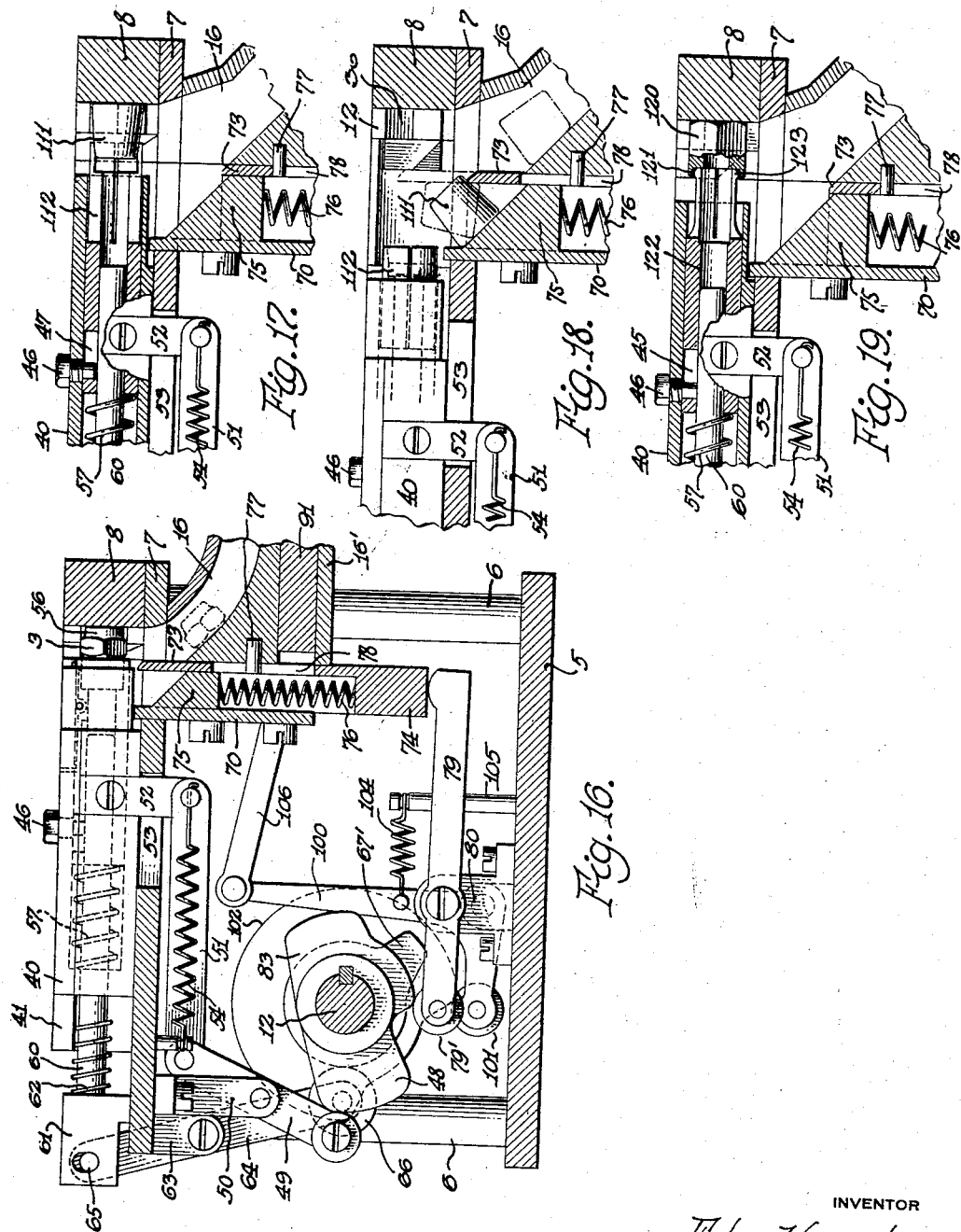

1,781,873

UNITED STATES PATENT OFFICE

FELIX HAMROL, OF DETROIT, MICHIGAN, ASSIGNOR, BY MESNE ASSIGNMENTS, TO MOTOR CITY SALES COMPANY, OF DETROIT, MICHIGAN, A CORPORATION OF MICHIGAN

AUTOMATIC LOADING DEVICE

Application filed January 31, 1929. Serial No. 336,414.

The present invention pertains to an automatic loading device, the object of which is to receive articles and to deliver them in a given position into another machine in which they are to be further worked upon. The machine of the invention is constructed to receive the article in two different positions, and the position in which an article is received is not defintely controlled but is determined only by the manner in which it happens to drop into the loading machine.

Having fallen into the loading machine in one particular position, the article would continue on its way, if not interrupted, and enter the subsequent machine in upright position. If, however, it enters the loading machine in the other position, it must be interrupted and inverted, so to speak, in order to enter the subsequent machine in upright position. The loading device of this invention, although entirely automatic, is constructed in such a manner as not to interfere with the articles entering in the first mentioned or correct position and to act upon and invert those entering in the other position.

The invention is fully disclosed by way of example in the following description and in the accompanying drawing, in which—

Figure 1 is a plan view of the machine;

Figs. 2 and 3 are detail cross sections showing in elevation the cams for operating the gripping jaws;

Fig. 4 is a transverse section on the line 4—4 of Fig. 1;

Fig. 4ª is a detail of Fig. 4, showing one of the cams isolated and the member operated thereby;

Fig. 5 is a longitudinal section on the line 5—5 of Fig. 1;

Figs. 6 and 7 are detail sections on the lines 6, 6, and 7, 7 respectively of Fig. 4;

Fig. 8 is a rear end view of the machine;

Fig. 9 is a section similar to Fig. 5 but showing the gripping jaws in a different position;

Fig. 10 is a detail cross section showing the grasping device taking hold of the article;

Fig. 11 is a detail section showing the cam mechanism for operating the grasping device;

Figs. 12, 13, 14 and 15 are sections similar to Figs. 4 and 10 and showing successive positions of the parts during the handling of the article;

Fig. 16 is a cross section similar to Fig. 4, illustrating the action when the article enters the loading machine in upright position;

Fig. 17 is a detail cross section of a modified structure for handling an article of a different shape;

Fig. 18 is a similar section of the same modification, showing a different stage of the operation; and Fig. 19 is an other detail cross section showing another modification for a different form of article.

Reference to these views will now be made by use of like characters which are employed to designate corresponding parts throughout.

The machine of this invention is constructed for the purpose of receiving articles, such as nuts, and deliver them in one given position into another machine in which the articles are to be operated upon. The latter machine is illustrated as a rotatable turret 1 having a circular series of chucks 2. The articles to be operated upon are nuts 3 which are to be tapped by the machine 1, and consequently they must be delivered to the chucks 2 in only one given position which will be termed the upright position. If the articles 3 were alike at both ends, two different positions in the turrets would be available and permissible, and simple means could be provided for restricting the articles to these two positions in entering the turrets. However, when both ends of the articles are different, only one mode of insertion in the turrets is permissible, and the machine of this invention receives the articles and delivers them to the turrets in only this one position. It is by virtue of the difference between the ends of the article that the loading device acts selectively on only those that require to be inverted.

The loading machine is built within a frame comprising a base 5 and legs or posts 6 upon which a table top 7 is secured. At one of the longitudinal edges of the machine is a pair of guide members 8 abutting each other and secured to the table by screws 9.

The abutting faces of the members 8 are grooved at 10, as shown more clearly in Figure 9, to provide a way for a pair of jaw members 11 and 12. The upper faces of the members 8 are notched to provide a receiving opening 13 (Figure 1) communicating with the grooves 10 to which articles 3 are delivered by means of a chute 14. This chute is so dimensioned as to receive the articles in only one axial position, i. e., with their axes transverse to the opening 13, but a given end of an article may face in either direction.

Before going further into the actual description and operation of the loading device, it may be noticed that at a given point or station 15, preferably midway between the ends of the members 8, the articles are permitted to drop into a chute formed in a body member 16 suitably secured to the front edge of the machine. This chute delivers the articles to the machine 1 as will be more fully described as the description proceeds. If the articles 3 entering the delivery opening 13 in a selected one of the two possible positions were permitted to proceed to the station 15 and chute 16, without interference, they would proceed to the chucks 2 in the upright positions. If entering the opening 13 in the other position, they would require to be inverted before entering the chute. The loading machine carries the articles from the receiving opening 13 to the station 15 and inverts those that require inversion, but takes no action on the others. The apparatus for performing these functions will now be described.

A pair of upright bearings 20 at the ends of the base 5 support a main shaft 21 having at one end a pulley or equivalent device 22 to which power is applied. The shaft extends longitudinally of the machine as clearly shown in Figure 8.

A pair of bearings 23 are suspended from the table top 7 for the purpose of supporting stub shafts 24 which lie parallel to each other and in a plane perpendicular to that of the shaft 21. At one end of each stub shaft is secured a lever or arm 25 having its free end received in a socket 26 in one of the gripping jaws 11 and 12. These arms are normally drawn towards one end of the table 7 by springs 27 secured to the arms and to studs 28 attached to the table. The remaining end of each stub shaft has fixed thereto an arm 29 at the lower end of which is a roller 30.

At the arms 29, a pair of cams 31 and 32 (Figures 2 and 3) are secured to the shaft 21 in such a position as to respectively engage the rollers 30. It will be seen that these cams are neither parallel nor identical, the cam 31 having two rises 33 and 34, while the cam 32 has one rise 35. A study of these cams will show that they act upon the rollers 30 and eventually on the jaws 11 and 12 as follows: The jaws are first brought together at the delivery opening 13 so that the V-shaped faces 36 thereof firmly engage the head of a nut 3 disposed in the opening. The jaws then move in the same direction and at equal rates to the station 15 and hold the nut stationary at the station for an instant. The jaw 12 then moves away from the jaw 11, as shown in Figure 9, and then both jaws return to the receiving opening 13, spaced apart sufficiently to receive another nut therebetween as shown in Figure 5. The jaws next clamp the nut and carry it to the station 15, repeating the operation already described.

The mechanism for grasping a nut that enters the machine in such a position as to require inversion includes a carrier member 40 slidable between a pair of guides 41 transversely of the table. The carrier is of box-like construction and contains a grasping member or collet 42 having its grasping end equipped with a pivotally mounted latch 43 operated by a spring 44. The latch is accommodated in a slot 45 in the top of the member 40, and the driving connection between the carrier and the collet includes a stud 46 fixed in the carrier and moving in a slot 47 in the collet.

The operating device for the grasping mechanism includes a cam 48 fixed on the shaft 21 (Figure 11) and acting on one end of a lever 49 which is fulcrumed on a hanger 50 suspended from the table 7. The other end of the lever is attached to a link 51 connected to the carrier by a bracket 52 (Figure 10) accommodated in a slot 53 in the table 7. The carrier is normally retracted by a spring 54 joining the bracket to a stud 55 secured to the table.

The carrier and collet are disposed directly in line with the station 15 so that the collet may grasp a nut held at the station. It will be seen in Figure 10 that the nut is formed at one end with a collar 56, and the collet is designed to engage the collar but not the other or flat end of the nut as will more fully appear hereinafter. The primary drive between the carrier and the collet is a spring 57 interposed between these parts and adapted to project the collet towards the station 15. This movement is however limited by the stud 46. The cam 48 is designed and located on the shaft 21 in such a manner as to throw the collet against the nut when the latter is held at the station 15 by the jaws 11 and 12 in the manner already described. Assuming that the nut has fallen into the receiving opening 13 and has been carried to the station in the position illustrated in Figures 1 and 8, it will be seen that this neck is grasped by the spring latch 43 of the collet while the nut is held stationary, after which the jaws spread as shown in Figure 9 and return to their initial position. The cam 48 now permits the carrier and collet to retract to the position shown in Figure 12 so that the nut may be ejected by means which will now be described.

The ejecting member is a rod 60 slidably passed through the carrier 40, spring 57 and collet 42 so that one end thereof is adapted to pass through the gripping end of the collet. The other end of the rod outside of the carrier 40, has a head 61 between which and the adjacent end of the carrier is a spring 62 surrounding the rod and tending to retract the latter from the gripping end of the collet.

A bracket 63 is supported from the table 7 and serves as the fulcrum for a lever 64 which has one end loosely connected to the head 64, as at 65, to permit play. The other end of the lever carries a roller 66 engageable by a cam 67 on the shaft 21. It will be seen, particularly in Figures 12 and 13, that this cam has a single and sharp rise 67', so that the action of the ejector rod 60 will be rather abrupt. The rise 67' comes into operation against the roller when the collet has been withdrawn to the position shown in Figures 12 and 13, whereupon the rod 60 strikes the nut and releases it from the collet, permitting it to fall into the mouth of the chute 16 as shown in Figure 13. The rod 60 now withdraws from the grasping end of the collet as the rise 67' has passed the roller 66, as shown in Figure 14.

The rear face of the body member 16 constituting the chute and a plate 70 secured to this face are formed to provide a way 71 in which a vertical channel member 72 is slidably mounted. The back of the channel is positioned to be raised to occupy a position between the gripping end of the collet and a nut held at the station 15. The back 73 of the channel member constitutes the partitioning member and may be said to divide the mouth of the chute into two compartments, one of which lies between the ejector and the holding means 11, 12 for the nut, and the other of which comprises the station 15.

The channel is formed at its lower end with a wall or abutment 74, and the upper end receives an abutment 75 extending from the plate 71. The channel proper contains a spring 76 having its ends bearing against these abutments, so that the channel is normally moved downwardly. The movement of the channel is limited by a pin 77 extending from the body member 16 into a slot 78 formed in the back of the channel.

The channel member is positively operated by a lever 79 having one end in engagement with the lower end thereof and an intermediate point fulcrumed at a bracket 80 on the base 5. The other end of the lever 79 carries a roller 79' engaging a cam 81 on the shaft 21 and consisting of two rises 82 and 83 and an arcuate portion 84 as shown more clearly in Figure 4ª. This cam is designed to hold the channel member depressed by means of the arc 84, as in Figure 10, then hold the channel elevated by the arc of the higher rise 82, as in Figures 12 and 13, and finally permit the channel to descend, by means of the straight side of the rise 82, to occupy the initial depressed position shown in Figures 10 and 15.

In the depressed or initial position shown in Figure 10, the channel permits the collet 40 to grasp the nut. After the collet has removed the nut from the station 15, the channel rises to the partitioning position in which it divides the mouth of the chute 16 into two compartments as already described and shown in Figure 12. While the channel is in this position, the rod 60 ejects the nut from the collet, and the upper and outward point of the nut falls against the back of the channel while the lowermost point of the neck 56 tilts on the base of the collet during ejection as shown in Figure 13. The channel now begins to descend or recede as the roller 79' rides on the straight side of the rise 82 as shown in Figure 14 so that the nut is guided by the engagement of the channel with the top of the nut. This action brings the top of the nut into contact with the base of the chute 16, thereby determining the manner in which the nut falls into and lies in the chute. The upper end of the back of the channel is beveled at 85 to conform with the base of the chute when the channel has reached its final, or initial, position as determined by the arc 84 of the cam 81.

The base of the body 16 is formed with a recess or chamber 90 (Figures 4 and 5) for accommodating a slide 91. The chute 16 has a vertical end 93, and the nut which has passed down the chute is constrained to pass into the portion 93 by means of a wall member 94 secured to the front end of the body 16 and constituting a wall of the portion 93.

On the base 16' of the member 16 is slidably mounted a jaw 95 guided by studs 96 passing therethrough and anchored in the forward end of the slide 91. Springs 97 surrounding the studs and engaging the heads thereof bear against the jaw 95 and urge it towards the slide. The jaw is limited in this movement by a notch 98 cut therein and receiving the lower end of the wall member 94. The confronting faces of the slide 91 and jaw 95 are shaped to engage the sides or faces of the nut as indicated by the numeral 99 in Figure 1.

The mechanism for operating the slide comprises a bell crank lever 100 fulcrumed to the bracket 80 and equipped at one end with a roller 101 engaging a large cam 102 on the shaft 21. This cam is circular with the exception of a single notch 103 which effects an oscillation of the lever 100 as will presently appear. The roller 101 is normally held in engagement with the cam 102 by means of a spring 104 connecting an arm of the lever to a stud 105 on the base 5. The remaining end of the lever 100 is joined by a link 106 to a pin 107 (Figure 1) anchored in the slide 91 and passing through a slot 108 in one of the sides of the body 16 adjacent the cavity 90.

When the roller 101 rides on the main arc of the cam 102, the slide 91 is disposed rearwardly and inwardly of the chute end 93 and is spaced sufficiently from the jaw 95 to provide ample clearance for a nut to drop into the space between these parts as illustrated in Figures 1 and 4. When the roller 101 enters the notch 103, the slide 91 moves forward, binding the nut against the jaw 95 and moving both parts forwardly against the action of the springs 97, until the nut is brought over an aperture 109 in the base 16', which aperture is in turn directly over one of the chucks when the machine 1 is at rest for loading. It will be understood that the machine 1 is operated and timed by any suitable means in synchronism with the loading device in a manner to bring one of the chucks 2 at rest beneath the aperture 109 while a nut is being delivered to the aperture by the slide 91. A ram 110 releases the nut from between the jaw and slide and drives it through the aperture 109 into the chuck 2. When the roller 101 rises out of the notch 103, the slide is retracted to the position shown in Figure 4, and the jaw 95 is moved against the wall member 94.

Figure 16 illustrates the operation of the loading device when the nut enters the receiving opening 13 in the other position, i. e. with the neck 56 presented forwardly rather than towards the collet 42. As the carrier 40 advances towards the nut, the collet abuts the head of the nut but does not enclose or grasp the same. The collet therefore is held stationary while the carrier 40 continues to advance to the end of its forward stroke, and this relative movement between the collet and carrier is permitted by the yieldable drive connection 57 between these parts. When the carrier and collet recede from the nut, the latter merely drops into the chute 16.

The importance of having the station 15 entirely at the forward side of the partitioning channel 73 will now be apparent, inasmuch as this member does not interfere with the nut in the case where it falls directly into the chute, without being acted upon by the collet, as in Figure 16. The other case where the nut is inverted by the collet with the aid of the partitioning member has already been described.

The loading device is applicable also to members other than nuts, the only requirement being that the articles have one end different from the other in order to enable selective action by the collet. In the instance shown in Figure 17, the articles being loaded are tapered roller bearings 111. The collet 112 is shaped to receive the smaller end but is not of sufficient size to receive the larger end. When the member 111 enters with its smaller end presented towards the collet, it is gripped thereby and inverted with the aid of the partition 73 as shown in Figure 18, but if entering with its larger end facing the collet, it merely drops directly into the chute without having been grasped by the collet.

In Figure 19 is shown another modification of the invention where the distinction between the ends of the article 120 is that one of them is counterbored as at 121. The collet 122 is of the expanding type having a rounded tip 123 which readily enters the counterbore and holds the article 120 by the tension of the fingers of the collet. If the article 120 enters in such a manner as to permit the collet to enter the counterbore 121, the article is thus drawn inwardly of the machine and then released from the collet by the mechanism already described, but if the article enters with its plane end facing the collet, no such action takes place, and the article merely drops directly into the chute at the forward side of the partitioning member 73.

Although specific embodiments of the invention have been illustrated and described, it will be understood that various alterations in the details of construction may be made without departing from the scope of the invention, as indicated by the appended claims.

What I claim is:—

1. In a device for loading articles into a machine, holding means for retaining an article, a carrier movable towards said holding means, a collet yieldably carried by said carrier and adapted to grasp a given end of an article and to exclude the other end, a slot and pin connection between said carrier and collet, an ejector rod slidable through said collet and engageable with said article to remove the same from said collet, a chute beneath said holding means, and means for operating said carrier and ejector rod.

2. In a device for loading articles into a machine, holding means for retaining an article, grasping means adapted to grasp a given end of said article and to exclude the other end, an ejector adapted to release the article from said grasping means, a delivery chute beneath said holding means, a partition slidable in the mouth of said chute and adapted to divide the same into two compartments, one of which is between said holding means and ejector, said ejector being timed to discharge the article from said grasping means into said compartment, said partition being actuated and timed to engage the discharged article and guide it into said chute.

3. In a device for loading articles into a machine, holding means for retaining an article, a carrier movable towards said holding means, grasping means carried by said carrier and yieldably held thereby, said grasping means being shaped to receive a given end of the article and to exclude the other end, an ejector adapted to release the article from said grasping means, a delivery chute beneath said holding means, and a partition slidable in the mouth of said chute and adapted to divide the same into two compartments, one of which is between said holding means and ejector, said ejector being timed to discharge the article from said grasping means into said compartment, said partition being actuated and timed to engage the discharged article and guide it into said chute.

4. In a device for loading articles into a machine, holding means for retaining an article, a carrier movable towards said holding means, a collet yieldably carried by said carrier and adapted to grasp a given end of an article and to exclude the other end, a slot and pin connection between said carrier and collet, an ejector rod slidable through said collet and engageable with said article to remove the same from said collet, a chute beneath said holding means, means for operating said carrier and ejector rod, and a partition slidable in the mouth of said chute and adapted to divide the same into two compartments, one of which is between said holding means and ejector rod, said rod being timed to discharge the article upon said collet into said compartment, said partition being actuated and timed to engage the discharged article and guide it into said chute.

5. In a device for loading articles into a machine, said device having an opening for receiving such articles, grasping means adapted to grasp an article, a pair of jaws adapted to engage an article at the receiving opening and carry it to a point opposite said grasping means, means for actuating said jaws and releasing them from the article when the latter is engaged by said grasping means, an ejector adapted to release the article from said grasping means, and a delivery chute beneath said holding means.

6. In a device for loading articles into a machine, a pair of jaws adapted to hold and release an article, means for actuating said jaws, a carrier movable towards said jaws, grasping means carried by said carrier and yieldably held thereby, said grasping means being shaped to receive a given end of the article and to exclude the other end, an ejector adapted to release the article from said grasping means, and a delivery chute beneath said jaws.

7. In a device for loading articles into a machine, said device having an opening for receiving such articles, a carrier, grasping means carried by said carrier and yieldably held thereby, said grasping means being shaped to receive a given end of the article and to exclude the other end, a pair of jaws adapted to engage a member at said receiving opening and carry it to a point opposite said grasping means, said carrier being movable towards said point, means for actuating said jaws and releasing them from said article when the latter is engaged, an ejector adapted to release the article from said grasping means, and a delivery chute beneath said holding means.

8. In a device for loading articles into a machine, a pair of jaws adapted to hold and release an article, means for actuating said jaws, grasping means adapted to grasp a given end of said article and to exclude the other end, an ejector adapted to release the article from said grasping means, a delivery chute beneath said jaws, a partition slidable in the mouth of said chute and adapted to divide the same into two compartments, one of which is between said ejector and jaws, said ejector being timed to discharge the article from said grasping means into said compartment, said partition being actuated and timed to engage the discharged article and guide it into said chute.

9. In a device for loading articles into a machine, said device having an opening for receiving such articles, grasping means adapted to grasp an article, a pair of jaws adapted to engage an article at the receiving opening and carry it to a point opposite said grasping means, means for actuating said jaws and releasing them from the article when the latter is engaged by said grasping means, an ejector adapted to release the article from said grasping means, a delivery chute beneath said jaws, and a partition slidable in the mouth of said chute and adapted to divide the same into two compartments, one of which is between said ejector and jaws, said ejector being timed to discharge the article from said grasping means into said compartment, said partition being actuated and timed to engage the discharged article and guide it into said chute.

In testimony whereof I affix my signature.

FELIX HAMROL.